United States Patent [19]

Hashimoto et al.

[11] Patent Number: 4,529,406
[45] Date of Patent: Jul. 16, 1985

[54] NITROTHIAZOLYL-MONOAZO-2,2,4-TRIMETHYL-1,2,3,4-TETRAHYDROQUINOLINE COMPOUNDS FOR POLYESTER

[75] Inventors: Kiyoyasu Hashimoto, Toyonaka; Akira Murata, Nishinomiya; Kiyoteru Kojima, Kobe; Toshio Nakamatzu, Ibaraki; Akira Takeshita, Toyonaka, all of Japan

[73] Assignee: Research Association of Dyestuff Manufacturers, Tokyo, Japan

[21] Appl. No.: 514,709

[22] Filed: Jul. 18, 1983

[30] Foreign Application Priority Data

Jul. 27, 1982 [JP] Japan ............... 57-131381

[51] Int. Cl.³ .............................. C09B 29/44
[52] U.S. Cl. .............................. 8/691; 8/529; 8/531; 8/921; 8/922; 8/924; 8/928; 534/733; 534/766
[58] Field of Search ............. 8/691; 260/155, 158

[56] References Cited

U.S. PATENT DOCUMENTS

| | | | |
|---|---|---|---|
| 3,206,452 | 9/1965 | Straley et al. | 260/155 |
| 3,349,075 | 10/1967 | Wallace et al. | 8/691 |
| 3,635,941 | 1/1972 | Weaver et al. | 260/155 |
| 3,699,092 | 10/1972 | Weaver et al. | 260/155 |
| 3,716,327 | 2/1973 | Weaver et al. | 8/696 |
| 3,787,388 | 1/1974 | Weaver et al. | 260/155 |

FOREIGN PATENT DOCUMENTS 1195243 6/1970 United Kingdom.
2036777 7/1980 United Kingdom.

OTHER PUBLICATIONS

Hallas, G., J. Soc. Dyers and Colourists, 1979, vol. 95, 285-294.

Primary Examiner—A. Lionel Clingman
Attorney, Agent, or Firm—Stevens, Davis, Miller & Mosher

[57] ABSTRACT

A monoazo compound of the formula,

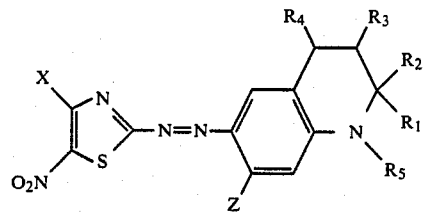

wherein X is hydrogen atom or lower alkyl group; Z is hydrogen atom, halogen atom, alkyl group, acylamino group, benzoylamino group or alkylsulfonylamino group; $R_1$, $R_2$, $R_3$ and $R_4$ independently are hydrogen atom or alkyl group, provided that $R_1$, $R_2$, $R_3$ and $R_4$ cannot simultaneously be hydrogen atoms; and $R_5$ is hydrogen atom, alkyl group, substituted alkyl group, alkenyl group, cycloalkyl group, aralkyl group or phenyl group.

7 Claims, No Drawings

NITROTHIAZOLYL-MONOAZO-2,2,4-TRIMETHYL-1,2,3,4-TETRAHYDROQUINOLINE COMPOUNDS FOR POLYESTER

The present invention relates to novel nitrothiazoleazo compounds suitable for dyeing synthetic fibers. More particularly, the invention relates to water-insoluble nitrothiazoleazo compounds suitable for dyeing synthetic fibers, such as polyester fiber, polyamide fiber and the like, in a blue color. The compounds of the prior art which have been used for this type of dyeing consist primarily of the anthraquinone disperse dyes. The use of the anthraquinone disperse dyes has been preferred in the past, despite the fact that they exhibit a relatively low molar absorption coefficient and poor dyeability, since these dyes exhibit superior decomposition resistance in dye baths and good levelness of the dyed material as well as good color brilliance. However, the anthraquinone dyes have as a major drawbacks the fact that they are relatively expensive and have poor dyeability.

Previously known azo disperse dyes have also been used for the dyeing of hydrophobic fibers, these dyes having as an advantage the fact that they are less expensive than the anthraquinone dyes. However, the azo dyes have been found to exhibit drawbacks such as poor decomposition resistance in dye paths and poor levellness of the dyed material.

The invention provides nitrothiazoleazo compounds having good color brilliance, good decomposition resistance, good levellness of the dyed material and good dyeability properties as well as good color fastnesses.

Monoazo compounds of the present invention are represented by the formula (I):

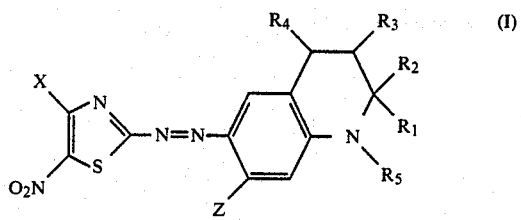

wherein X is hydrogen atom or lower alkyl group; Z is hydrogen atom, halogen atom, alkyl group, acylamino group, benzoylamino group or alkylsulfonylamino group; $R_1$, $R_2$, $R_3$ and $R_4$ independently are hydrogen atom or alkyl group, provided that $R_1$, $R_2$, $R_3$ and $R_4$ cannot simultaneously be hydrogen atoms; and $R_5$ is hydrogen atom, alkyl group, substituted alkyl group, alkenyl group, cycloalkyl group, aralkyl group or phenyl group.

As used in the invention, the term "lower" means that the number of carbon atoms is from 1 to 4.

In the formula (I), it is preferred that X is hydrogen atom, Z is hydrogen atom, chlorine atom, methyl group, acetylamino group, propionylamino group, benzoylamino group, methylsulfonylamino group or ethylsulfonylamino group, $R_1$, $R_2$ and $R_4$ are methyl group, $R_3$ is hydrogen atom and $R_5$ is aralkyl group, aryloxyalkyl group, benzoyloxyalkyl group or phenylcarbamoyloxyalkyl group, preferably, $R_5$ is phenoxyethyl group; phenethyl group, benzoyloxyethyl group or phenylcarbamoyloxyethyl group.

As a disperse dye for dyeing synthetic fibers such as polyester fibers, polyamide fibers and the like, the monoazo compounds of the invention are excellent in various properties. For example, they inhibit excellent dyeability, color-yield, stability in a dye bath, decomposition resistance in a dye bath and the like and, furthermore, they provide dyed goods of good levelness and high fastnesses, such as fastness to water, fastness to washing, fastness to rubbing, fastness to sublimation and fastness to light, which keep high fastnesses even after the resin treatment.

In the invention, the monoazo compounds of the formula (I) can be produced by diazotizing an amine compound of the formula (II):

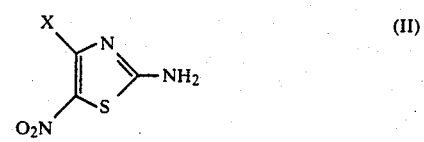

wherein X is as defined above, by a known process such as the process mentioned in U.S. Pat. No. 2,659,719, followed by coupling the resulting diazonium compound with a compound of the formula (III):

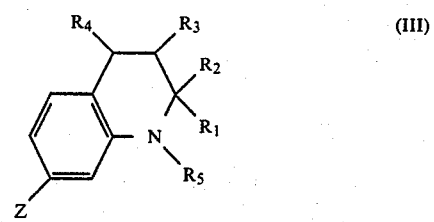

wherein Z, $R_1$, $R_2$, $R_3$, $R_4$ and $R_5$ are as defined above.

The compound represented by the formula (III) can be produced by known process, for example, the process mentioned in Japanese Patent Publication No. 34680/1972.

The monoazo compounds of the formula (I) are obtained as follows:

The compound of the formula (II) (diazo component) is diazotized, as it is or after being dissolved or suspended in a mineral acid (e.g. sulfuric acid, hydrochloric acid), organic acid (e.g. acetic acid, propionic acid); with nitrosylsulfuric acid at a low temperature, preferably below 5° C. for about a few hours. While the compound of the formula (III) is dissolved in a mineral acid (e.g. sulfuric acid, hydrochloric acid), organic acid (e.g. acetic acid, propionic acid), organic solvent (e.g. methanol, ethanol), or a mixture consisting of them and then the diazonium compound obtained above is added thereto preferably at a temperature of about 10° C. or less, to carry out a coupling reaction. After the reaction is finished, the deposited product is filtered to obtain a monoazo compound of the formula (I). Optionally, the reaction is carried out at a controlled pH value of 1–5, which is desirable because it accelerates the coupling reaction.

Specific examples of the compound of the formula (II) include the following compounds:
2-amino-5-nitrothiazole,
2-amino-4-methyl-5-nitrothiazole and
2-amino-4-ethyl-5-nitrothiazole.

Specific examples of the formula (III) include the following compounds:
2,2,4-trimethyl-1,2,3,4-tetrahydroquinoline, 1-ethyl-2,2,4-trimethyl-1,2,3,4-tetrahydroquinoline,
1-butyl-2,7-dimethyl-1,2,3,4-tetrahydroquinoline,
1-(2-hydroxyethyl)-2,2,4,7-tetramethyl-1,2,3,4-tetrahydroquinoline,
1-(2-cyanoethyl)-2,2,4-trimethyl-7-chloro-1,2,3,4-tetrahydroquinoline,
1-benzyl-2,7-dimethyl-1,2,3,4-tetrahydroquinoline,
1-cyclohexyl-2,2,4-trimethyl-1,2,3,4-tetrahydroquinoline,
1-amyl-2,2,4-trimethyl-1,2,3,4-tetrahydroquinoline,
1-allyl-2,2,4-trimethyl-1,2,3,4-tetrahydroquinoline,
1-(2-acetoxyethyl)2,2,4-trimethyl-7-acetylamino-1,2,3,4-tetrahydroquinoline,
1-propyl-2,2,4-trimethyl-7-methylsulfonylamino-1,2,3,4-tetrahydroquinoline,
1-ethyl-2,2,4-trimethyl-7-benzoylamino-1,2,3,4-tetrahydroquinoline,
1-phenethyl-2,2,4-trimethyl-7-propionylamino-1,2,3,4-tetrahydroquinoline,
1-(2-benzoyloxyethyl)-2,2,4-trimethyl-1,2,3,4-tetrahydroquinoline,
1-(2-phenoxyethyl)-2,2,4-trimethyl-1,2,3,4-tetrahydroquinoline,
1-phenethyl-2,2,4-trimethyl-1,2,3,4-tetrahydroquinoline,
1-(2-phenylcarbamoyloxyethyl)-2,2,4-trimethyl-1,2,3,4-tetrahydroquinoline,
1-(2-phenoxyethyl)-2,2,4,7-tetramethyl-1,2,3,4-tetrahydroquinoline,
1-(2-benzoyloxyethyl)-2,2,4,7-tetramethyl-1,2,3,4-tetrahydroquinoline,
1-(2-allyloxyethyl)-2,2,4,7-tetramethyl-1,2,3,4-tetrahydroquinoline,
1-(2-methoxyethoxyethyl)-2,2,4-trimethyl-1,2,3,4-tetrahydroquinoline, and
1-(3-phenoxy-2-hydroxypropyl)-2,2,4-trimethyl-1,2,3,4-tetrahydroquinoline.

The synthetic fibers to which the invention is applicable include polyester fibers, polyamide fibers, polyolefin fibers, cellulose ester fibers and mixed yarns and fabrics of these fibers. The compounds of the invention exhibit particularly excellent dyeing properties when applied to polyester fibers.

In dyeing the synthetic fibers with the monoazo compounds of the invention, one or more compound(s) of the formula (I) is (are) pulverized into fine particles together with a suitable dispensing agent in an aqueous medium according to method well known to those skilled in the art. The dye composite thus obtained may be used either in the liquid form or in the powder form after spray-drying to the dyeing of the foregoing synthetic fibers. The dyeing is carried out according to processes well-known to those skilled in the art. Thus, a dye bath is prepared by dispersing the dye composite into an aqueous medium, and then a synthetic fiber is dipped in the dye bath and dyed under an increased pressure at a temperature not lower than 105° C., preferably at 110° C. to 140° C. Alternatively, the dyeing may also be carried out at a relatively high temperature, for example at the boiling temperature of water, in the presence of a carrier such as o-phenylphenol, trichlorobenzene and the like. Alternatively, the dyeing may also be carried out by the so-called "thermosol dyeing process" which comprises padding a cloth with a dye dispersion followed by dry-heat treatment at 150° to 230° C. for 30 to 120 seconds. Still further, the dye of the present invention may be used for printing the cloth with a color paste prepared from a dye containing dispersion and a suitable thickening agent, followed by steaming or a thermosol treatment. A solvent dyeing method using an organic solvent such as trichloroethylene, perchloroethylene and the like as a dyeing medium, is also employable.

The present invention will be illustrated in more detail with reference to the following examples which are not however to be interpreted as limiting the invention thereto. All parts and percents in the examples are by weight.

EXAMPLE 1

To 72.5 parts of a propionic acid/acetic acid mixture (14/86 by volume) was added 31.0 parts of 43% nitrosylsulfuric acid. After cooling the resulting mixture to 0° C., it was diazotized by slowly adding 14.5 parts of 2-amino-5-nitrothiazole thereto at a temperature of 0° C. or below and keeping the resulting mixture at that temperature for 3 hours with stirring. On the other hand, 26.0 parts of 1-ethyl-2,2,4-trimethyl-7-acetylamino-1,2,3,4-tetrahydroquinoline was dissolved into 100 parts of methanol, to which the above-mentioned diazonium solution was added while cooling it with ice to 5° C. or below. Then, pH was adjusted to 4–5 to complete the coupling reaction. The deposited product was collected by filtration, washed with water and dried. Then, 20.8 parts of a compound represented by the formula (1):

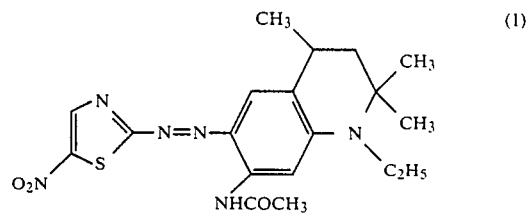

was obtained. Yield, 50% based on the coupling component.

The 1-ethyl-2,2,4-trimethyl-7-acetylamino-1,2,3,4-tetrahydroquinoline was prepared by the process mentioned in Japanese Patent Publication No. 34,680/72.

EXAMPLE 2

One part of the monoazo compound of the formula (1) was finely pulverized and dispersed together with 1 part of a formaldehyde-condensate of naphthalenesulfonic acid and 1 part of sodium ligninsulfonate to change it to a dispersible form. A dye bath was prepared therefrom by dispersing it uniformly together with 3 parts of the sulfuric ester of a higher alcohol into 3,000 parts of water. One hundred parts of a polyester textured yarn fabric was dipped in the dye bath and dyed at 130° C. for 60 minutes, after which the dyed product was subjected to a reduction clearing at 85° C. for 10 minutes in a liquor comprising 3 parts of sodium hydroxide, 3 parts of hydrosulfite, 3 parts of a betaine type amphoteric surfactant and 3,000 parts of water. Then, it was rinsed with water and dried to give a clear bluish-green colored dye material having a high color depth. The dyed material exhibited excellent fastnesses to sublimation, light, water and washing.

EXAMPLE 3

A compound of formula (2) was prepared in the same manner as in Example 1, except that 2-amino-5-nitrothiazole and 1-n-amyl-2,2,4-trimethyl-7-acetylamino-1,2,3,4-tetrahydroquinoline were used as the starting materials.

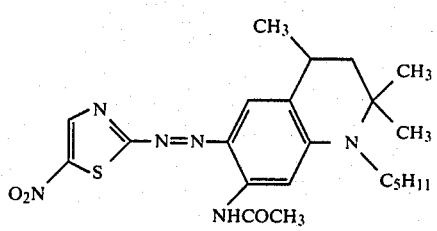
(2)

Yield, 49% based on the coupling component.

EXAMPLE 4

One part of the monoazo compound of the formula (2) was finely pulverized together with 2 parts of a formaldehyde condensate of naphthalenesulfonic acid to change it to a dispersible form. The dye composition thus obtained was added to 95 parts of a raw printing paste having the following composition and thoroughly kneaded to give a color paste:

| (Raw printing paste) | |
|---|---|
| 12% Maypro Gum NP 60 (Locust bean gum) | 63 parts |
| Sodium chlorate | 0.6 part |
| Tartaric acid | 0.4 part |
| Water | 36 parts |
| Total | 100 parts |

The color paste was printed on a polyester textured yarn fabric and dried, after which the fabric was steamed for 30 minutes by means of a high-pressure steamer (temperature 130°–135° C., pressure 3–4 kg/cm² gauge). Then, it was rinsed with water, dried, subjected to a reduction clearing treatment in the same manner as in Example 2, again rinsed with water and dried to obtain a clear bluish-green colored printed material having a high color depth which exhibited excellent fastnesses to sublimation, light, water and washing.

EXAMPLE 5

A compound of the formula (3) was prepared in the same manner as in Example 1, except that 2-amino-5-nitrothiazole and 1-(2-phenoxy)ethyl-2,2,4-trimethyl-1,2,3,4-tetrahydroquinoline were used as the starting materials.

Yield, 60% based on the coupling component. Dyeing was carried out in the same manner as in Example 2 using the compound thus obtained. The polyester fabric was dyed reddish-blue shades of very good fastness to light, washing, sublimation and water.

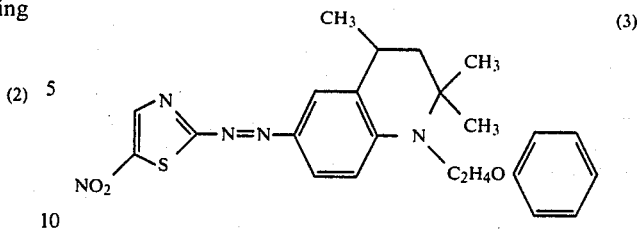
(3)

EXAMPLE 6

A compound of the formula (4) was prepared in the same manner as in Example 1, except that 2-amino-5-nitrothiazole and 1-(2-benzoyloxy)ethyl-2,2,4,7-tetramethyl-1,2,3,4-tetrahydroquinoline were used as the starting materials.

Yield, 63% based on the coupling component. Dyeing was carried out in the same manner as in Example 2 using the compound thus obtained. The polyester fabric was dyed blue shades of very good fastnesses to light, washing, sublimation and water.

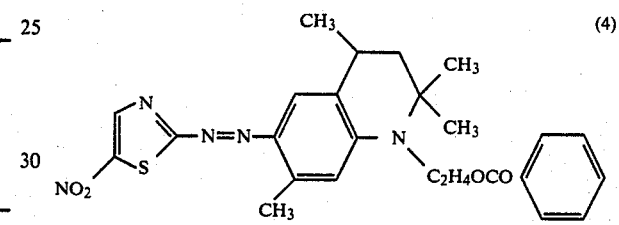
(4)

EXAMPLE 7

A compound of the formula (5) was prepared in the same manner as in Example 1, except that 2-amino-5-nitrothiazole and 1-(2-phenoxy)ethyl-2,2,4-trimethyl-1,2,3,4-tetrahydroquinoline were used as the starting materials.

Yield, 59% based on the coupling component. Dyeing was carried out in the same manner as in Example 2 using the compound thus obtained. The polyester fabric was dyed greenish-blue shades of very good fastnesses to light, washing, sublimation and water.

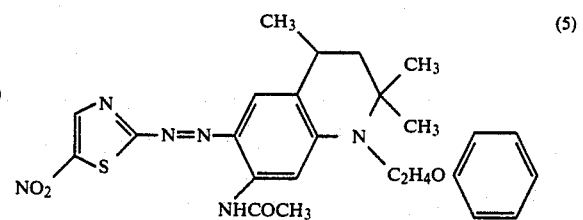
(5)

In the subsequent runs, the monoazo compounds of Table 1 were prepared in the same manner as in Example 1, with which polyester fabric was dyed in the same manner as in Example 2. The results obtained were as shown in Table 1, where the term "hue" signifies hue on polyester fabric.

TABLE 1

| Example No. | X | Z | $R_1$ | $R_2$ | $R_3$ | $R_4$ | $R_5$ | Hue |
|---|---|---|---|---|---|---|---|---|
| 8 | H | —NHCOCH$_3$ | —CH$_3$ | —CH$_3$ | H | —CH$_3$ | H | Blue |
| 9 | " | " | " | " | " | " | —C$_2$H$_4$OH | Greenish blue |
| 10 | " | —CH$_3$ | " | " | " | " | " | Blue |

TABLE 1-continued

| Example No. | X | Z | R₁ | R₂ | R₃ | R₄ | R₅ | Hue |
|---|---|---|---|---|---|---|---|---|
| 11 | " | " | " | " | " | " | —C₂H₄CN | " |
| 12 | " | —NHCO—C₆H₅ | " | " | " | " | H | " |
| 13 | " | H | " | " | " | " | —C₂H₄OCO—C₆H₅ | Reddish blue |
| 14 | " | " | " | " | " | " | —C₂H₄OCONH—C₆H₅ | " |
| 15 | " | " | " | " | " | " | —CH₂CH(OH)—CH₂—O—C₆H₅ | " |
| 16 | CH₃ | Cl | CH₃ | CH₃ | " | CH₃ | —C₆H₁₁ (cyclohexyl) | " |
| 17 | " | Br | " | " | " | " | —C₂H₄OCOCH₃ | " |
| 18 | " | " | " | " | " | " | —C₂H₄OCOCH₃ | " |
| 19 | " | —NHCOC₂H₅ | " | " | " | " | —C₂H₄OCH₃ | Bluish green |
| 20 | " | —NHCOCH₃ | " | H | " | H | CH₃ | " |
| 21 | " | " | " | " | " | " | —C₂H₄—C₆H₅ | " |
| 22 | " | " | " | " | " | CH₃ | —C₆H₁₃ | " |
| 23 | H | —NHSO₂CH₃ | " | " | " | " | —C₂H₄OC₂H₄OCH₃ | Blue |
| 24 | " | " | " | CH₃ | " | " | —C₂H₄O—C₆H₅ | " |
| 25 | C₂H₅ | " | " | " | " | " | —C₂H₄OC₂H₅ | " |
| 26 | H | CH₃ | " | " | " | " | —CH₂CH=CH₂ | " |
| 27 | " | " | " | " | " | " | —C₆H₅ | " |
| 28 | " | " | " | " | " | " | —C₂H₄OCOCH₃ | " |
| 29 | " | " | " | " | " | " | —C₂H₄OCOC₂H₅ | " |
| 30 | " | " | " | " | " | " | —C₂H₄OCONH—C₆H₅ | " |
| 31 | CH₃ | " | " | " | " | " | —CH₂CH(OH)CH₃ | " |
| 32 | H | H | " | " | " | " | —C₂H₄CN | Reddish blue |
| 33 | " | " | " | " | " | " | —C₂H₄OCH₂—C₆H₅ | " |
| 34 | CH₃ | " | " | " | " | " | —C₆H₁₁ (cyclohexyl) | Blue |
| 35 | " | CH₃ | " | " | " | " | —C₂H₄—O—C₆H₅ | " |
| 36 | " | " | " | " | " | " | —C₂H₄—C₆H₅ | " |
| 37 | " | " | " | " | " | " | —C₂H₄OC₂H₄OC₂H₅ | " |

TABLE 1-continued

| Example No. | X | Z | $R_1$ | $R_2$ | $R_3$ | $R_4$ | $R_5$ | Hue |
|---|---|---|---|---|---|---|---|---|
| 38 | " | " | " | " | " | " | $-C_2H_4OCH_2CH=CH_2$ | " |
| 39 | " | " | " | " | " | " | $-C_2H_4OC_2H_4-\!\!\!\!\bigcirc$ | " |
| 40 | " | H | " | " | " | " | $-C_2H_4-\!\!\!\!\bigcirc$ | Reddish blue |
| 41 | " | $CH_3$ | " | " | " | " | $-C_2H_4OCH_2-\!\!\!\!\bigcirc$ | Blue |

What is claimed is:

1. A monoazo compound of the formula:

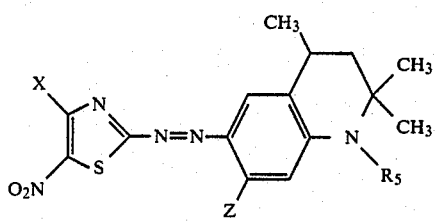

wherein X is hydrogen or lower alkyl; Z is hydrogen, halogen, alkyl, acylamino, benzoylamino or alkylsulfonylamino; $R_5$ is hydrogen, alkyl, cyanoalkyl, hydroxyalkyl, alkylcarbonyloxyalkyl, phenylcarbonyloxyalkyl, alkoxyalkyl, phenyloxyalkyl, alkoxycarbonyloxyalkyl, alkenyloxyalkyl, phenylalkyloxyalkyl, phenylcarbamoyloxyalkyl, alkenyl, cycloalkyl, aralkyl or phenyl.

2. The compound according to claim 1, which is represented by the following formula,

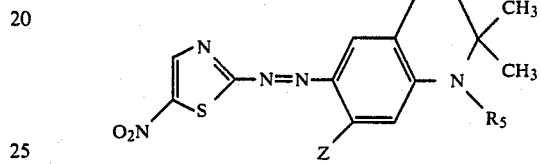

wherein Z is hydrogen atom, chlorine atom, methyl group, acetylamino group, propionylamino group, benzoylamino group, methylsulfonylamino group or ethylsulfonylamino group, $R_5$ is aralkyl group, aryloxyalkyl group, benzoyloxyalkyl group or phenylcarbamoyloxyalkyl group.

3. The compound according to claim 2, wherein $R_5$ is phenoxyethyl group, phenethyl group, benzoyloxyethyl group or phenylcarbamoyloxyethyl group.

4. The compound according to claim 2, wherein Z is hydrogen atom, methyl group or acetylamino group, $R_5$ is phenoxyethyl group.

5. The compound according to claim 2, wherein Z is hydrogen atom methyl group or acetylamino group, $R_5$ is benzoyloxyethyl group.

6. A process for dyeing a synthetic fiber which comprises contacting the synthetic fiber with the compound of claim 1.

7. A synthetic fiber dyed by the process of claim 6.

* * * * *